US005302983A

United States Patent [19]
Sato et al.

[11] Patent Number: 5,302,983
[45] Date of Patent: * Apr. 12, 1994

[54] PROJECTOR

[75] Inventors: Makoto Sato; Kazushi Yoshida, both of Tokyo, Japan

[73] Assignees: Casio Computer Co., Ltd.; Asahi Kogaku Kogyo Kabushiki Kaisha, Tokyo, Japan

[*] Notice: The portion of the term of this patent subsequent to Jul. 16, 2008 has been disclaimed.

[21] Appl. No.: 988,974

[22] Filed: Dec. 10, 1992

Related U.S. Application Data

[63] Continuation of Ser. No. 690,285, Apr. 24, 1991, Pat. No. 5,220,363, which is a continuation of Ser. No. 407,158, Sep. 14, 1989, Pat. No. 5,032,022.

[30] Foreign Application Priority Data

Sep. 14, 1988 [JP] Japan .................................. 63-230985
Oct. 13, 1988 [JP] Japan .................................. 63-255790

[51] Int. Cl.⁵ .............................................. G03B 21/14
[52] U.S. Cl. ........................................ 353/69; 353/70
[58] Field of Search ...................... 353/69, 70, 74, 76

[56] References Cited

U.S. PATENT DOCUMENTS

| | | | |
|---|---|---|---|
| 3,087,382 | 4/1963 | De Nygorden | 353/67 |
| 3,253,505 | 5/1966 | Miller | 353/70 |
| 3,963,337 | 6/1976 | Lundberg | 353/70 |
| 4,089,599 | 5/1978 | Kuboshima | 353/70 |
| 4,400,080 | 9/1983 | Ogawa et al. | 355/11 |
| 4,406,530 | 10/1983 | Hasegawa et al. | 353/66 |
| 4,422,153 | 12/1983 | Arai et al. | |
| 4,436,392 | 3/1984 | Vanderwerf | 353/70 |
| 4,436,393 | 3/1984 | Vanderwerf | 353/70 |
| 4,455,067 | 6/1984 | Hoppmann et al. | 353/69 |
| 4,722,593 | 2/1988 | Shaimazaki | 353/69 |
| 4,842,374 | 6/1989 | Ledebuhar | 353/31 |
| 4,976,536 | 12/1990 | Vogeley et al. | 353/77 |

FOREIGN PATENT DOCUMENTS

| | | | |
|---|---|---|---|
| 61-018172 | 5/1977 | Japan . | |
| 52-062434 | 5/1977 | Japan | 353/69 |

Primary Examiner—William A. Cuchlinski, Jr.
Assistant Examiner—William C. Dowling
Attorney, Agent, or Firm—Sandler, Greenblum & Bernstein

[57] ABSTRACT

A projecting apparatus having a first projecting system for projecting an object to be projected to form an intermediate image, and a second projecting system for projecting the intermediate image formed by the first projecting system onto a screen. The first projecting system is adapted to distort the image of the object, and the second projecting system is adapted to correct the distorted image to project an enlarged image analogous to the object onto the screen.

10 Claims, 15 Drawing Sheets

PRIOR ART

PROJECTOR

This application is a continuation of application Ser. No. 07/690,285 filed Apr. 24, 1991 and now U.S. Pat. No. 5,220,363 which is a continuation of application Ser. No. 07/407,158, filed Sep. 14, 1989, which issued as U.S. Pat. No. 5,032,022, on Jul. 16, 1991.

BACKGROUND OF THE INVENTION

1. Field of the Invention

The present invention relates to a projector and more precisely it relates to an apparatus for enlarging and projecting an image of an object, such as liquid crystal panel, Braun tube, original picture film, or a testpiece.

2. Description of Related Art

In recent years, projectors which project an enlarged image of an object to be indicated (object to be projected), such as a liquid crystal indication panel, Braun tube (CRT), or an original picture film have been developed.

FIG. 13 shows a known projector of the kind, in which a liquid crystal panel is used as an object to be indicated. In FIG. 13, numeral 1 designates a projector body which is provided on its front face with an indication window with a transmission type screen 2 as a projection plane. A transmission type liquid crystal display panel 3 is provided on the rear portion of the projector body 1. In front of the transmission type liquid crystal display panel 3 is located a projection lens 4 which has an optical axis 0 perpendicular to the plane of the projection screen 2. The liquid crystal display panel 3 has a center on the optical axis 0 of the projection lens 4 and lies in a plane parallel with the plane of the projection screen 2. Numeral 5 designates a light source for illuminating the liquid crystal display panel 3 from behind.

Light emitted from the light source 5 is transmitted through the liquid crystal display panel 3, so that an indication image of the liquid crystal display panel 3 is enlarged by the projection lens 4 to project the same onto the projection screen 2. The image projected on the projection screen can be viewed from the front side of the apparatus. In the arrangement shown in FIG. 13, the transmission type screen 2 as a projection plane is provided on the front face of the projector body 1, and both the liquid crystal display panel 3 and the projection lens 4 are provided in the projector body 1. Alternatively, it is also known to provide an external screen outside the projector body 1, so that an image is projected on the external screen.

In the projector as mentioned above, an increase of an optical path length from the projection lens 4 to the screen 2 makes it possible to spread the luminous flux transmitted through the projection lens 4 at a larger scale, and accordingly it is desirable to space the projection lens 4 from the screen 2 at a longer distance in order to produce a larger image on the screen 2.

However, since the projection lens 4 and the liquid crystal display panel 3 are aligned on the optical axis perpendicular to the plane of the screen 2 in the known apparatus, as shown in FIG. 13, accordingly, an increased distance between the projection lens 4 and the screen 2 inevitably leads to an increased size of the apparatus as a whole.

It is also known to incline the projection lens 4 with respect to the projection screen 2, so that the image is projected on the screen 2 from the inclined direction, as shown in FIG. 14. This arrangement of the inclined projection lens 4 makes it possible to locate the projection lens 4 closer to the screen 2 while guaranteeing an increased optical path length therebetween. In the arrangement, it is also possible to reduce the size (depth) of a projector which has the transmission type screen 2 at the front face thereof and the liquid crystal display panel 3 and the projection lens 4 in the projector body 1. In the arrangement shown in FIG. 14, the liquid crystal display panel 3 is inclined at a predetermined inclination angle $\theta$ with respect to a plane perpendicular to the optical axis 0 of the projection lens 4. An extension plane 3a of the display surface of the liquid crystal display panel 3 intersects an extension plane of the principal plane 4a of the projection lens 4 at an intersecting line P at which the extension plane of the principal plane 4a intersects an extension plane 2a of the screen 2, so that an indication image of the liquid crystal display panel 3 can be formed on the screen 2 in the state of "in focus". This is a so-called "Scheimpflug's Law".

However, in the arrangement shown in FIG. 14, the image projected on the screen 2 is elliptically distorted or deformed. This is because there is a difference in magnification between the points of the image projected on the screen 2.

The elliptical distortion of an image will be discussed below in more detail.

FIG. 15 which shows an optical system of a known projection type indicating apparatus Ao designates the indication image of the liquid crystal display panel 3, A the projection image projected on the screen 2, F and F' the focal points of the projection lens 4, $\theta$ the intersecting angle of the extension plane 3a of the liquid crystal display panel 3 and the extension plane 4a of the principal plane of the projection lens 4, $\theta'$ the intersecting angle of the extension plane 4a of the principal plane of the projection lens 4 and the extension plane of the screen 2, respectively. Note that $\theta < 0$ and $\theta' > 0$. The origin of the coordinate x-y-z is identical to the focal point F and the origin of the coordinate x'-y'-z' is identical to the focal point F'. In FIG. 15, supposing that the z coordinate of a point Zo on the optical axis 0 of the indication image Ao is represented by zo, the z' coordinate of a point Zo' on the optical axis 0 of the projection image A is represented by zo', and the focal length of the projection lens 4 is f, if the following equation is given, the extension plane 3a of the liquid crystal display panel 3 and the extension plane 4a of the principal plane of the projection lens 4 intersect at the point P, so that the projection image A projected on the screen 2 is in focus:

$$f/zo = -zo'/f = \tan\theta'/\tan\theta$$

Here, since $z = zo + y \cdot \tan\theta$ and $z' = z0' + y' \cdot \tan\theta'$, the magnification m of the points of the projection image A with respect to the indication image Ao in the directions x, y and z is given by the following equations:

$$\begin{aligned} m &= x'/x = y'/y = f/z \\ &= f/(zo + y \cdot \tan\theta) \\ &= -z'/f = -(zo' + y' \cdot \tan\theta')/f \end{aligned}$$

and the magnification M in the y direction is:

$$M = Y'/Y = (y'/\cos\theta')/(y/\cos\theta)$$
$$= m \cdot \cos\theta/\cos\theta'$$

Consequently, in the case of a projection type display apparatus as shown in FIG. 14 in which an image is projected from a downwardly inclined direction onto the projection screen 2, even if the display image Ao of the liquid crystal display panel 3 is rectangular, as shown in FIG. 16a, the projected image A formed on the screen 2 is deformed into an inverted trapezoid, as shown in FIG. 16b. The same is true in a projector in which a Braun tube or an original picture film or the like is used as an indicator.

The above discussion can be applied to an inspecting projector in which a testpiece (object to be projected) is illuminated with an illumination light to enlarge and project an image thereof.

FIG. 17 shows a conventional inspecting projector in which the liquid crystal display panel 3 in FIGS. 14 and 15 is replaced with a test piece 3'. In FIG. 17, a light source 8a for a bright field inspection and a light source 8b for a dark field inspection are provided to illuminate the testpiece 3'. A mirror 7 is located in front of the screen 2. Other construction of the arrangement shown in FIG. 17 is optically identical to that of FIGS. 14 and 15. The bright field inspecting light source 8a and the dark field inspecting light source 8b are selectively made ON in accordance with the state of the testpiece 3'. When the bright field inspecting light source 8a is made ON, an inspector can view a bright image of the testpiece surface formed on the screen 2 and a dark flaw or foreign matter (dust etc.). On the other hand, when the dark field inspecting light source 8b is made ON, an inspector can view a bright flaw or foreign matter and a dark image of the testpiece surface formed on the screen 2.

In the inspecting projector as mentioned above, even if the test piece 3' is rectangular, as shown in FIG. 16a, the projected image A formed on the screen 2 is deformed into an inverted trapezoid, as shown in FIG. 16b, thus resulting in a difficulty in viewing and a decreased precision of inspection.

SUMMARY OF THE INVENTION

The primary object of the present invention is to provide a projecting apparatus which projects an enlarged image of an object to be projected, on a screen from an inclined direction so as to prevent the projected image from being deformed or distorted.

To achieve the object, according to the present invention, a projecting apparatus comprises a projecting lens and an auxiliary projecting lens provided between the projecting lens and an object to be projected. The auxiliary projecting lens having a principal plane which is inclined with respect to the surface of the object to be projected, so that an image surface of an intermediate image formed by the auxiliary projecting lens is inclined with the principal plane of the projecting lens, wherein the auxiliary projecting lens and the projecting lens are located to have the following relationship:

$$\sin\theta1'/\sin\theta2 = -(f1/f2)\cdot(\tan\theta1'/\tan\theta1)\cdot(\tan\theta2'/\tan\theta2)$$

wherein,
f1 = focal length of the auxiliary projecting lens
f2 = focal length of the projecting lens
θ1 = intersecting angle of an extension of the principal plane of the auxiliary projecting lens and an extension of a surface of an object to be projected
θ1' = intersecting angle of an extension of the principal plane of the auxiliary projecting lens and an extension of an image surface of an image formed by the auxiliary projecting lens
θ2 = intersecting angle of an extension of an image surface of an intermediate image formed by the auxiliary projecting lens and an extension of a principal plane of the projecting lens
θ2' = intersecting angle of an extension of a principal plane of the projecting lens and an extension of the projection plane Preferably, we have the following equation:

$$\sin\theta1/\sin\theta2' = -f1/f2$$

The present invention can also be applied to a projector in which a light path from the projecting lens to the projection plane is a linear light path, so that an image light transmitted through the projecting lens is directly projected and a projector in which the light path is a refracted light path, so that the image light transmitted through the projecting lens is reflected by at least one reflection mirror to project the same onto the projection plane. In either case, to form an "in focus" image projected on the projection plane, it is necessary to place the auxiliary projecting lens so that the extension of the principal plane of the auxiliary projecting lens intersects the extension of the projection plane of an object to be projected at a point at which the extension of the principal plane of the auxiliary projecting lens intersects the extension of the image surface of the intermediate image formed by the auxiliary projecting lens. In addition, it is also necessary to position the projecting lens in such a way that the extension of the principal plane of the projecting lens substantially intersects the extension of the image surface of the intermediate image formed by the auxiliary projecting lens at a point at which the extension of the image surface of the intermediate image intersects the extension of the projection plane (i.e. in case of the linear projecting light path, an extension of the actual projection plane, or in case of the refracted projecting light path having an image light reflecting mirror, an extension of an imaginary projection plane when the refracted light path from the projecting lens to the projection plane is linearly developed).

In summary, in the projection type display apparatus of the present invention, the auxiliary projecting lens provided between the main projecting lens and the object to be projected corrects the trapezoidal distortion or deformation of an image projected on the projection plane by the projecting lens. The principal plane of the auxiliary projecting lens is inclined relative to the projection surface of the object to be projected and the image surface of the intermediate image formed by the auxiliary projecting lens is inclined relative to the principal plane of the projecting lens. The relationship between the auxiliary projecting lens and the projecting lens as specified by the equations mentioned above eliminates the trapezoidal distortion of the intermediate image by the projecting lens. Namely, the image projected onto the projection plane from the inclined direction by the projecting lens is distorted in the opposite direction to the distortion of the intermediate image, so that when the intermediate image distorted by the auxiliary projecting lens is projected of the image by the auxiliary projecting lens can be cancelled by the distortion of the image projected on the projection plane by the projecting lens, and accordingly the projected image formed on the projection plane has no trapezoidal distortion.

The equation of (sin $\theta_1$/sin $\theta_2'= -f_1/f_2$) mentioned above makes an image projected on the projection plane analogous to the displayed image of the object. Namely, the magnification of the image projected on the projection plane in the longitudinal and crosswise directions is identical to that of the displayed image of the object.

The object to be projected in the present invention can be a liquid crystal panel, a Braun tube, or an original picture film, or the like. In other words, the object can be either of a self-light emission type or of a type in which it is illuminated by an illuminating device. Furthermore, the object can be either of a light transmission type in which light is transmitted therethrough or of a light reflection type in which light is reflected thereby. In addition, in the present invention, the optical system for making an image (light) of the object incident upon the auxiliary projecting lens is not limited to a special system.

According to another aspect of the present invention, there is provided a projecting apparatus comprising a auxiliary projecting lens which projects an object to be projected to form an intermediate image, and a projecting lens which projects the intermediate image formed by the auxiliary projecting lens onto a screen.

According to still another aspect of the present invention, there is provided a projecting apparatus which comprises a first projecting system for projecting an object to be projected to form an intermediate image, and a second projecting system for projecting the intermediate image formed by the first projecting system onto a screen. The first projecting system is adapted to distort the image of the object, and the second projecting system is adapted to correct the distorted image to project an enlarged image analogous to the object onto the screen.

According to a variant of the present invention, there is provided a projecting apparatus which comprises a first projecting system and a second projecting system. The first projecting apparatus has an auxiliary projecting lens for projecting an object to be projected to form an intermediate image, so that the object and the auxiliary projecting lens are located in such a way that an extension of a projecting plane of the object, an extension of a principal plane of the auxiliary projecting lens and an extension of the intermediate image substantially intersects at a first straight line, and second projecting system has a projecting lens for projecting the intermediate image onto the screen, so that the projecting lens and the screen are arranged in such a way that the extension of the intermediate image, an extension of a principal plane of the projecting lens, and an extension of the screen substantially intersects at a second straight line.

BRIEF DESCRIPTION OF THE DRAWINGS

The invention will be described below in detail with reference to the accompanying drawings, in which.

DETAILED DESCRIPTION OF PREFERRED EMBODIMENTS

Figure 1:
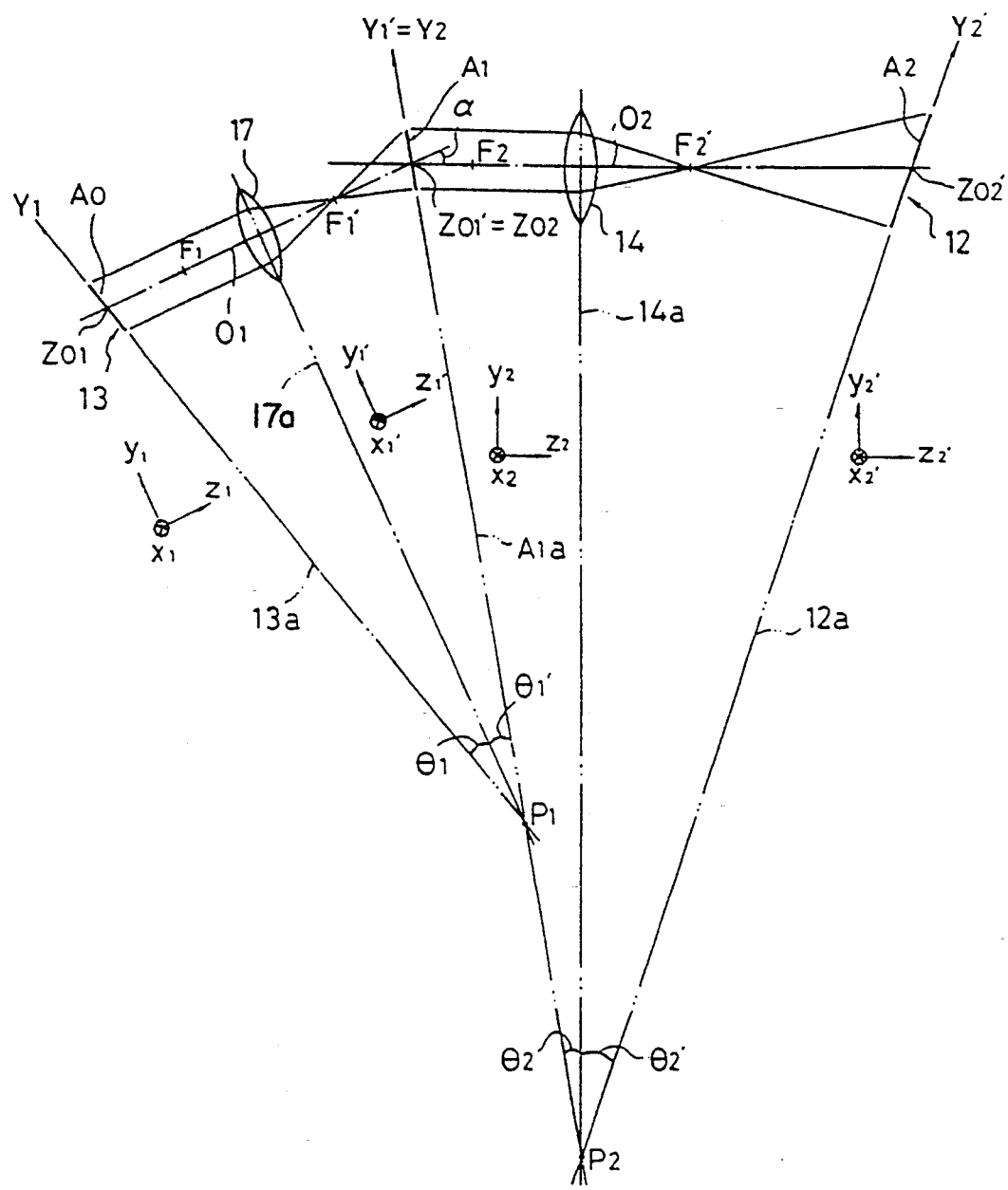
FIG. 1 is a schematic view of a basic optical system in a projector according to the present invention.

A projector shown in FIG. 1, which shows an optical principle thereof according to the present invention, has a first optical system which projects an indication image Ao of an indicator 13 (object to be projected), such as a liquid crystal display panel or the like through an auxiliary projecting lens 17 to form a first projection image (intermediate projection image) A1, and a second optical system which projects the first image A1 onto a projection plane, such as a projection screen 12 from an inclined direction through a projecting lens 14 to form a screen projection image A2. Although the first projection image A1 is a real image in the illustrate embodiment for clarification, it can also be a virtual image. In FIG. 1, F1 and F1' designate focal points of the auxiliary projecting lens 17; F2 and F2' focal points of the projecting lens 14; $\theta_1$ an intersecting angle of an extension plane 13a of an indication surface 13 of a indicator (object) 13 and an extension plane 17a of a principal plane of the auxiliary projecting lens 17; $\theta_1'$ an intersecting angle of the extension plane 17a of the principal plane of the auxiliary projecting lens 17 and an extension plane A1a of the first projection image A1; $\theta_2$ an intersecting angle of the extension plane A1a of the first projection plane A1 and an extension plane 14a of the principal plane of the projecting lens 14; and, $\theta 2'$ an intersecting angle of the extension plane 14a of the screen plane 12, respectively. In the illustrated embodiments, $\theta < 0$, $\theta 1' > 0$, $\theta 2 < 0$, $\theta 2' > 0$. In addition, the origin of the coordinate $x_1$, $y_1$ and $z_1$ is located at the focal point F1 of the auxiliary projecting lens, the origin of the coordinate $x_1'$, $y_1'$ and $z_1'$ is located at the focal point F1' of the auxiliary projecting lens 17, and the origin of the coordinate $x_2$, $y_2$ and $z_2$ is located at the focal point F2 of the projecting lens 14, and the origin of the coordinate $x_2'$, $y_2'$ and $z_2'$ is located at the focal point F2' of the projecting lens 14, respectively.

Figure 15:
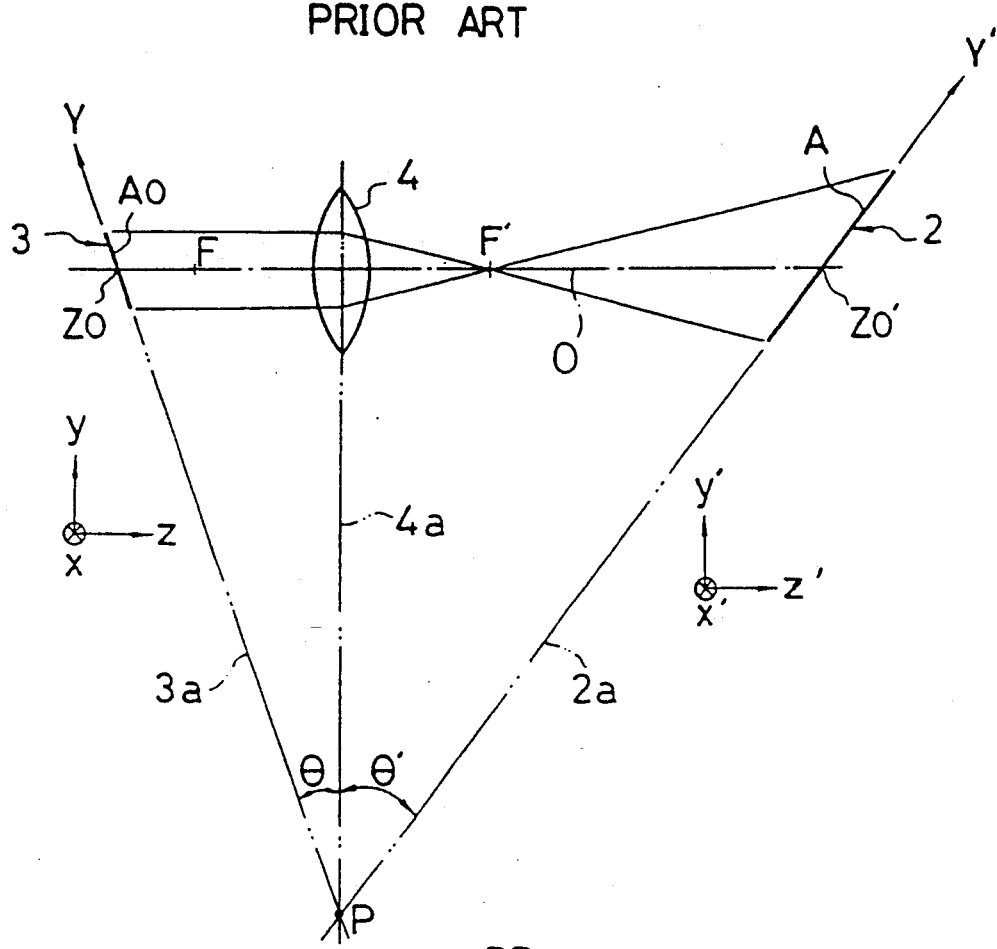
FIG. 15 is a view showing an equivalent light path of a projector shown in FIG. 14.
Figure 16A:
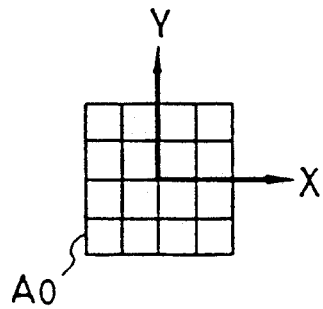
FIGS. 16a and 16b are views showing shapes of an object to be projected and a projected image, respectively.
Figure 16B:
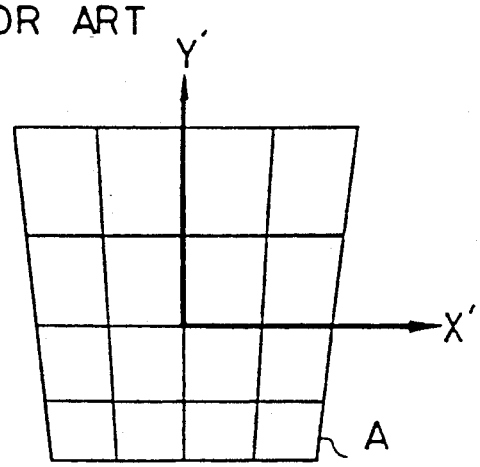
Figure 17:
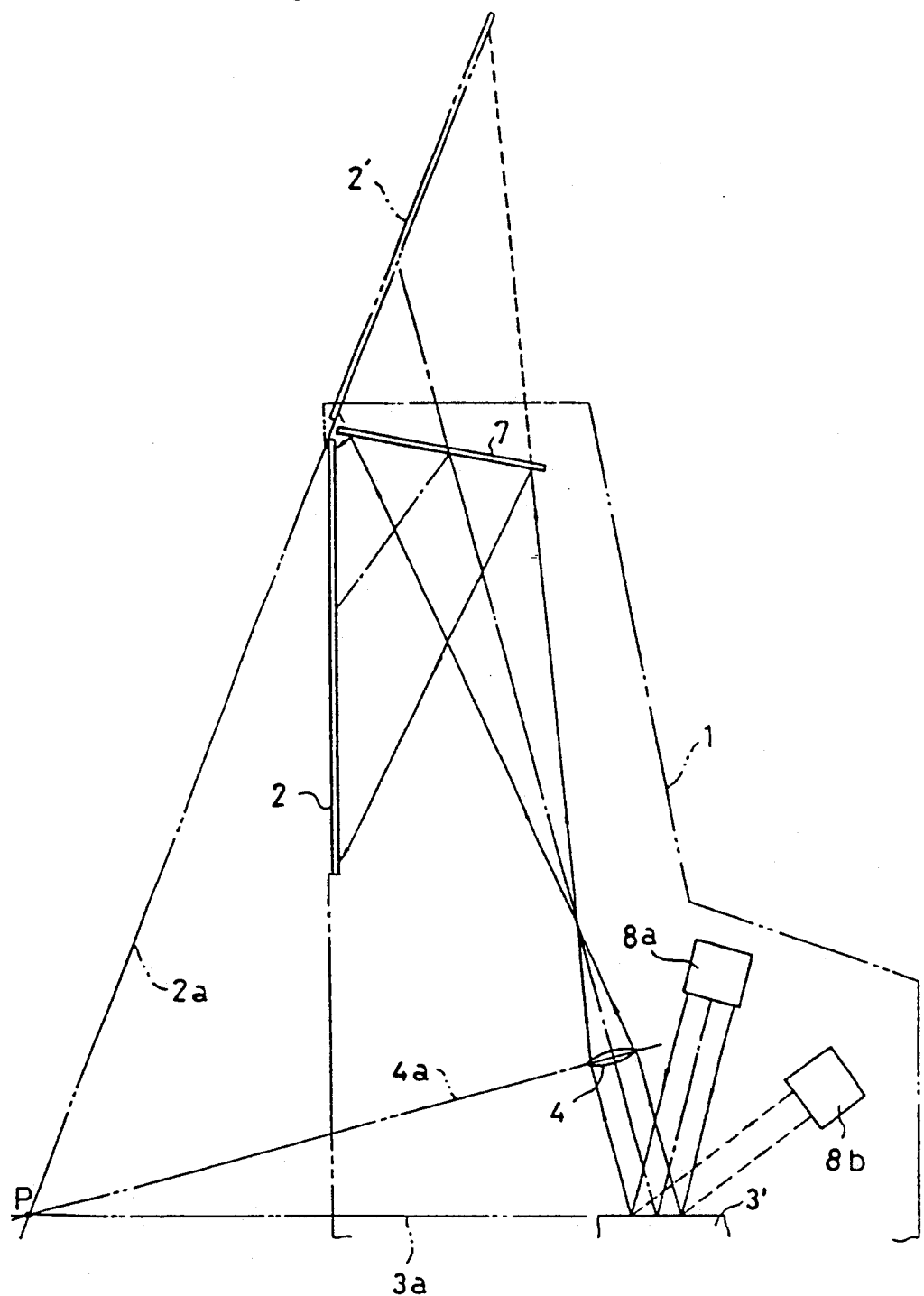
FIG. 17 is a longitudinal sectional side view of a known projector which is applied to an inspector.

The optical system is essentially composed of a combination of two conventional projectors, based on "Scheimpflug's law", shown in FIG. 15. In the first optical system, when we have the following relationship, the extension plane 13a of the indicator 13, extension plane 17a of the principal plane of the auxiliary projecting lens 17 and the extension plane A1a of the first projection image A1 intersect at the point P1 to form an "in focus" first projection image A1;

$$f1/z_{01} = -z_{01}'/f1 = \tan\theta 1'/\tan\theta 1$$

wherein $z_1$ coordinate of the point $Z_{01}$ on the optical axis 01 of the auxiliary projecting lens of the indication image Ao is $z_{01}$, $z_1'$ coordinate of the point $Z_{01}'$ on the optical axis 01 of the first projection image A1 is $z_{01}'$, and the focal length of the auxiliary projecting lens 17 is f1, respectively.

Similarly, in the second optical system, when we have the following relationship, the extension plane A1a of the first projection image A1, the extension plane 14a of the principal plane of the projecting lens 17 and the extension plane 12a of the screen 12 intersect at the point P2 to form an "in focus" screen projection image A2;

$$f2/z_{02} = -z_{02}'/f2 = \tan\theta 2'/\tan\theta 2$$

wherein $z_2$ coordinate of the point $Z_{02}$ ($=Z_{01}'$) on the optical axis 02 of the first projection image A1 is $z_{02}$, $z_2'$ coordinate of the point $Z_{02}'$ on the optical axis 02 of the screen projection image A2 is $z_{02}'$, and the focal length of the projecting lens 14 is f2, respectively.

Supposing that the first optical system and the second optical system intersects each other at an intersecting angle $\alpha$ ($\alpha = \theta 1' - \theta 2$) which is identical to an intersecting angle between the optical axis 01 of the auxiliary projecting lens 17 and the optical axis 02 of the projecting lens 14, if the equation of $$\sin\theta 1'/\sin\theta 2 = z_{01}'/z_{02}$$

is given, the magnification m (i.e. a product of the magnification $m_1$ of the first optical system and the magnification $m_2$ of the second optical system) of each point on the screen projection image A2 relative to the indication image Ao in the X direction is given by the following equation:

$$\begin{aligned}m &= X2'/X1 = m_1 \cdot m_2 \\ &= -\{(z_{01}' + y_1'\tan\theta 1')/f1\} \cdot \{f2/(z_{02} + y_2\tan\theta 2)\} \\ &= -\{(z_{01}' + Y_1\sin\theta 1')/f1\} \cdot \{f2/(z_{02} + Y_2\sin\theta 2)\}\end{aligned}$$

On the other hand, the magnification M in the Y direction is given by the following equation:

$$\begin{aligned}M &= Y_2/Y_1 = M1 \cdot M2 \\ &= m \cdot (\cos\theta 1 \cdot \cos\theta 2)/(\cos\theta 1' \cdot \cos\theta 2')\end{aligned}$$

Here, taking $Y2 = Y1'$ into account, $$\begin{aligned}m &= -[(z_{01}' + Y_1\sin\theta 1')/f1] \cdot [z_{01}' \cdot f2/z_{02}(z_{01}' + Y_1\sin\theta 1')] \\ &= -(z_{01}'/z_{02}) \cdot (f2/f1) \\ M &= -(z_{01}'/z_{02}) \cdot (f2/f1) \cdot (\cos\theta 1/\cos\theta 1') \cdot (\cos\theta 2/\cos\theta 2')\end{aligned}$$

Therefore, if the following equation (1) is given, $$\sin\theta 1'/\sin\theta 2 = -(f1/f2)\cdot(\tan\theta 1'/\tan\theta 1)\cdot(\tan\theta 2'/\tan\theta 2) \quad (1)$$

the screen projection image A2 has no trapezoidal distortion.

Figure 18:
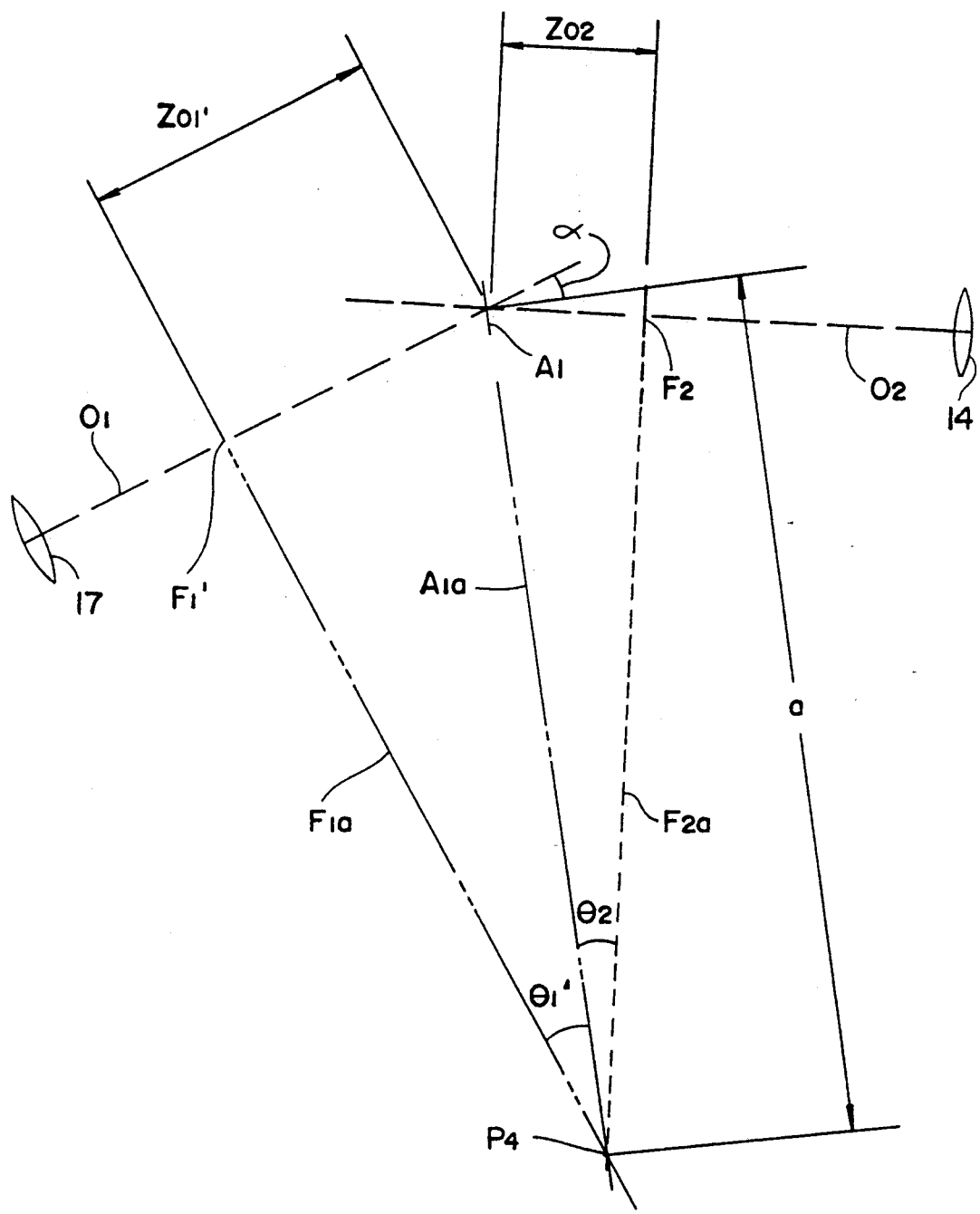
FIG. 18 is an enlarged schematic view of a portion of FIG. 1 illustrating further features of the basic optical system according to the present invention.

In FIG. 1, and as illustrated in greater detail in FIG. 18, a further feature of the invention is disclosed. FIG. 18 illustrates the optical system of FIG. 1 and shows the extension plane A1a of the intermediate image A1, as well as plane F1a, perpendicular to the optical axis 01 of the auxiliary projecting lens 17 and passing through the image side focal point F1' of the auxiliary projecting lens 17. Also illustrated is plane F2a perpendicular to the optical axis 02 of the projecting lens 14 and passing though the object side focal point F2 of the projecting lens 14. Planes F1a and F2a intersect at a line which lies in the extension plane A1a of the intermediate image A1. In FIG. 18, the point of intersection of the planes F1a, A1a and F2a is designated P4. The intersection of planes F1a and F2a at a line falling in plane A1a follows from the aforementioned relationship $$\sin\theta 1'/\sin\theta 02 = z_{01}'/z_{02}.$$

Satisfaction of the above-noted relationship and the resulting intersection of planes F1a, F2a along the extension plane A1a results in an image on the screen being formed without distortion.

Figure 2A:
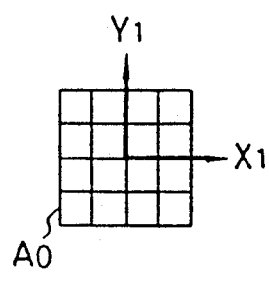
FIGS. 2a, 2b and 2c are schematic views showing shapes of an image of an object to be projected, an intermediate projected image formed by an auxiliary projecting lens, and an image formed on a projection plane, respectively.
Figure 2B:
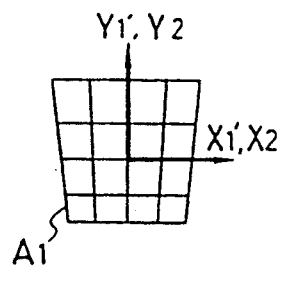
Figure 2C:
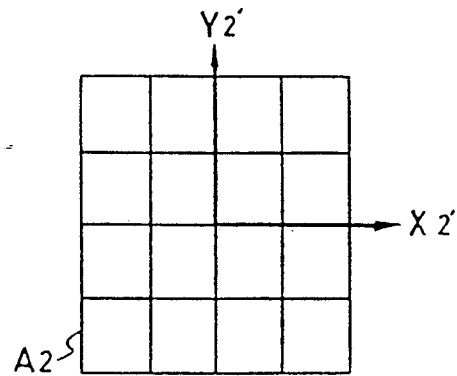

FIGS. 2a, 2b and 2c show shapes of the indication image Ao of the indicator 13, the first projection image A1 and the screen projection image A2. In case of a rectangular indication image Ao, as shown in FIG. 2a, the first projection image A1 is distorted into a trapezoidal shape, as shown in FIG. 2b. However, the screen projection image A2 which is distorted into a trapezoidal shape in a direction opposite to the trapezoid of the first projection image A1 has no distortion, since the trapezoidal distortion is cancelled, as shown in FIG. 2c.

The screen projection image A1 shown in FIG. 2c has magnifications slightly different from each other in the X and Y directions, with respect to the indication image Ao. Namely, the image is slightly extended in the longitudinal direction (Y direction). However, an enlarged screen projection image A2 which has an identical magnification in the X and Y directions and which is analogous to the indication image Ao of the indicator 13 can be formed, when the following equation is given:

$$\sin\theta 1/\sin\theta 2' = -f1/f2 \quad (2)$$

The following discussion will be directed to a more concrete embodiments of the present invention.

Figure 3:
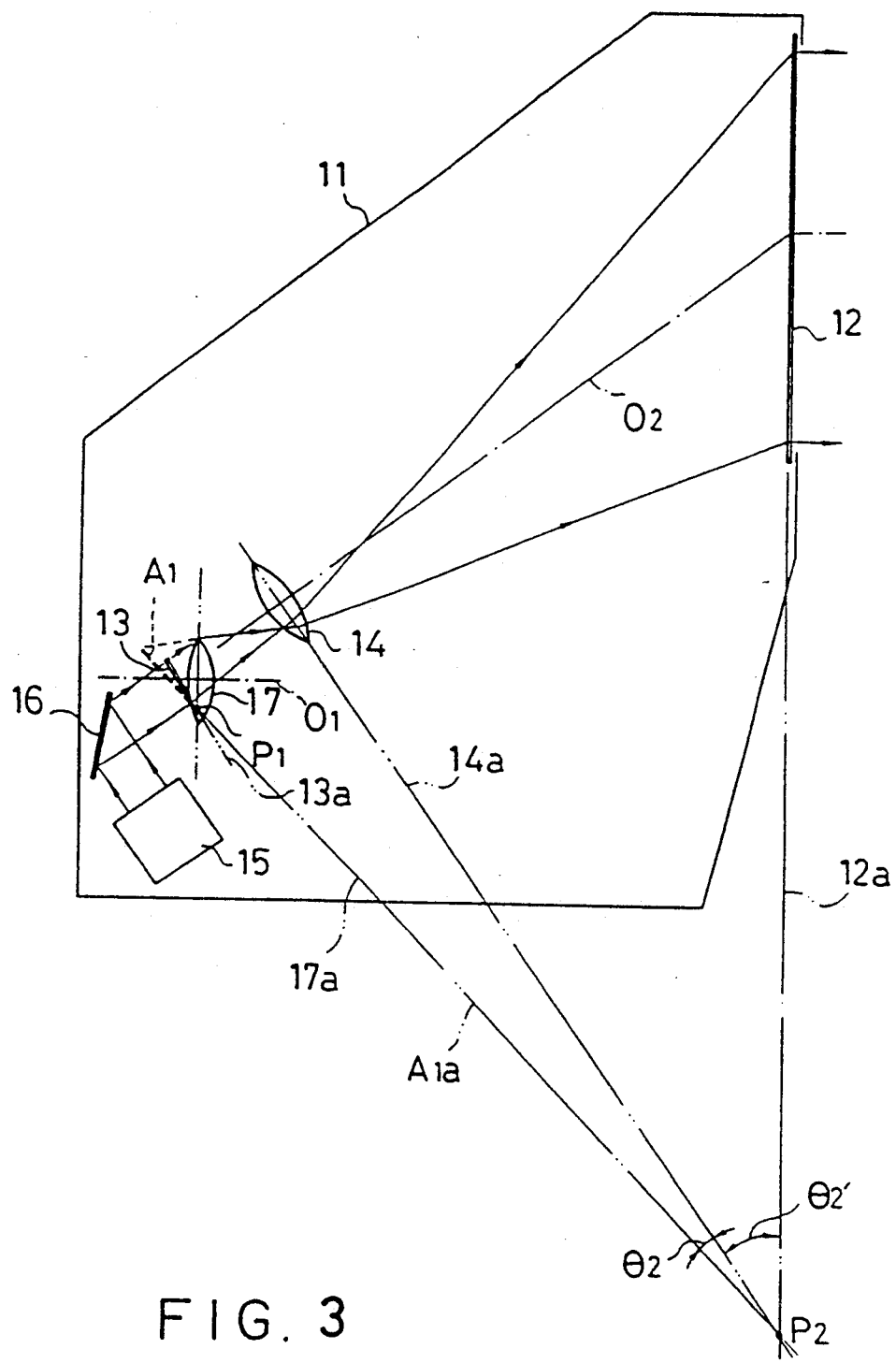
FIG. 3 is a longitudinal sectional side view of a projector according to an embodiment of the present invention.
Figure 4:
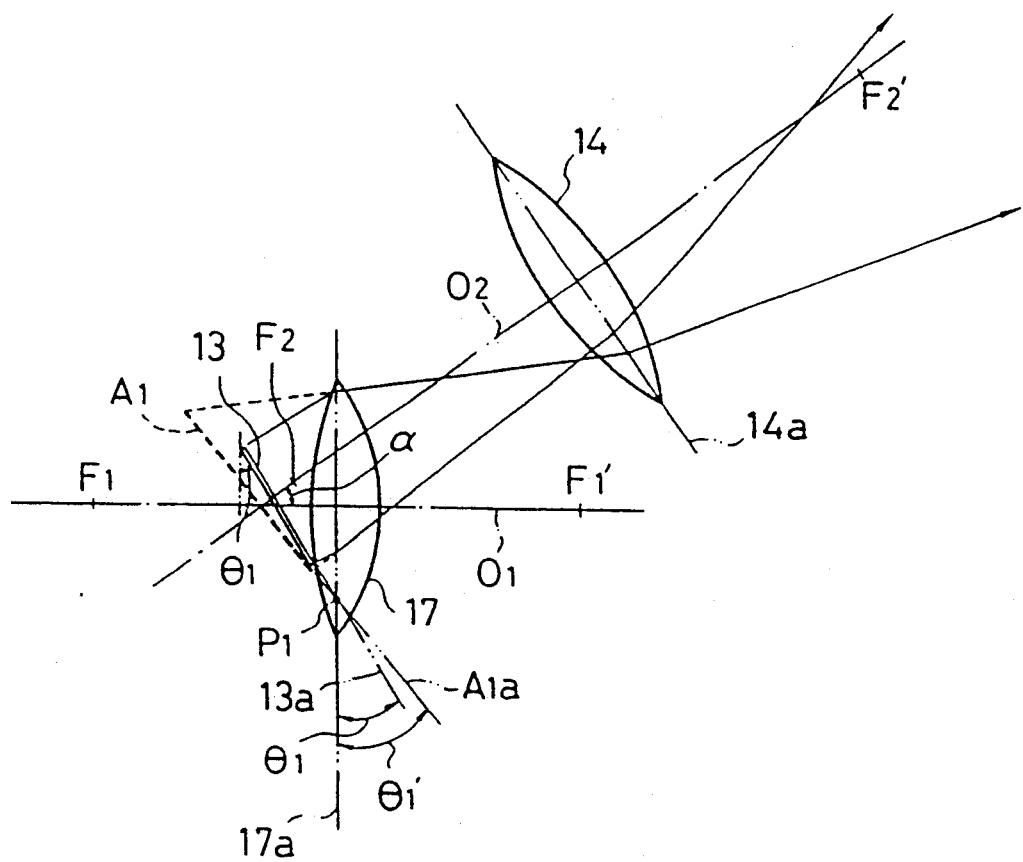
FIG. 4 is an enlarged view of an optical system shown in FIG. 3.

FIGS. 3 and 4 show a first embodiment of the present invention, in which numeral 11 designates a projecting indicator body which is provided on its front end with an indicating window having a transmission type screen 12 as a projection plane, 13 an indicator, for example, a transmission type of liquid crystal display panel which is provided below the screen 12 and in the rear portion of the body 11, and 14 a projecting lens which is obliquely opposed to the screen 12. Numeral 15 designates a light source for illuminating the liquid crystal panel 13 from behind, and 16 a light reflecting mirror which reflects light emitted from the light source 15 toward the liquid crystal panel 13.

The auxiliary projecting lens 17 which is made of a convex lens provided between the liquid crystal display panel 13 and the projecting lens 14 has an optical axis O1 which intersects the optical axis O2 of the projecting lens 14 at a predetermined angle $\alpha$. The liquid crystal panel 13 is opposed to the auxiliary projecting lens 17 with a predetermined inclination angle $\theta_1$ with respect to a plane normal to the optical axis O1 of the auxiliary projecting lens 17. In FIG. 4, F1 and F1' are focal points of the auxiliary projecting lens 17 and F2, and F2' are focal points of the projecting lens 14, respectively. The auxiliary projecting lens 17 deforms the indication image of the liquid crystal panel 13 into a trapezoidal shape to be incident upon the screen 12. The auxiliary projecting lens 17 forms the first projection image A1 of the indication image of the liquid crystal panel 13 at a position opposed to the projecting lens 14. The first projection image A1 is a virtual image which is formed on a surface A1a which intersects the planes 13a and 17a at the intersecting point P1 of the extension plane 17a of the principal plane of the auxiliary projecting lens 17 and the extension plane 13a of the liquid crystal panel 13. The projecting lens 14 is located so that the extension 14a of the principal plane thereof intersects the point P2 at which the extension plane A1a of the image surface of the virtual image A1 formed by the auxiliary projecting lens 17 intersects the extension 12a of the screen 12.

In the projector, light emitted from the light source 15 is reflected by the reflecting mirror 16 to be made incident upon the liquid crystal display panel 13, so that the indication image, such as a TV picture or the like displayed by the liquid crystal display panel 13 is incident upon the auxiliary projecting lens 17 to form a virtual image A1 (first projection image) of an indication image of the liquid crystal display panel 13. The virtual image A1 is enlarged by the projecting lens 14 to be projected onto the transmission type screen 12, so that the image projected onto the screen 12 can be viewed from front. The transmission type screen 12 has at its rear face (light incident surface in the body 11), a circular Fresnel lens which corrects the image light projected onto the screen 12 from the inclined direction into light normal to the plane of the screen 12, and at its front face, a lenticular lens which disperse light transmitted through the screen 12.

Although in the illustrated embodiment, the projecting light path from the projecting lens 14 to the screen 12 is a linear light path in which the image light transmitted through the projecting lens 14 is directly projected onto the screen 12, it is also possible to reflect the image light transmitted through the projecting lens 14 by the mirror in order to project the reflected light onto the screen 12, thus resulting in a decreased size of the apparatus especially in the depth of the projector.

Figure 5:
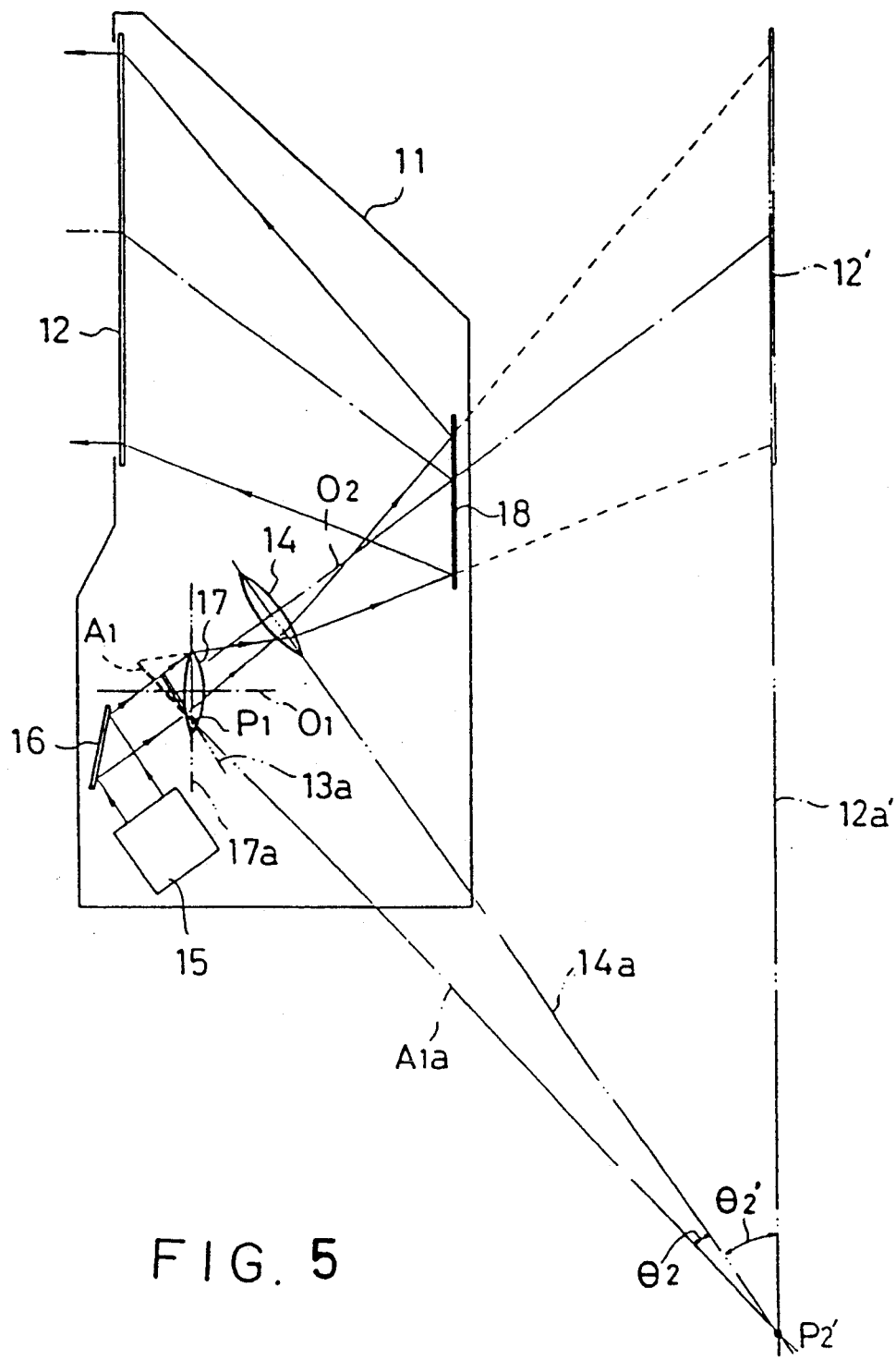
FIG. 5 is a longitudinal sectional side view of a projector according to another embodiment of the present invention.

This alternative is shown in FIG. 5, which shows a second embodiment of the present invention. In FIG. 5, the projecting light path from the projecting lens 14 to the screen 12 is a refracted path in which the image light transmitted through the projecting lens 14 is reflected by a mirror 18 which is opposed to the screen 12, so that the projecting lens 14 is inclined with respect to the reflecting mirror 18. In this alternative in which the image light path is a refracted path, the liquid crystal display panel 13 and the auxiliary projecting lens 17 are located so as to satisfy the relationship as specified by the above mentioned equation (1) or the equations (1) and (2). Furthermore, the auxiliary projecting lens 17 is located so that the extension 17a of the principal plane thereof intersects the intersecting point (line) P1 at which the extension 13a of the liquid crystal display panel 13 intersects the extension A1a of the image surface of the virtual image formed by the auxiliary projecting lens 17. The projecting lens 14 is located so that the extension 14a of the principal plane thereof intersects the intersecting point (line) P2' at which the extension A1a of the image surface of the first projection image (virtual image) formed by the auxiliary projecting lens 17 intersects the extension 12a' of the imaginary screen plane 12' when the refracted light path from the projecting lens 14 to the screen 12 is linearly developed. These arrangements eliminate the trapezoidal distortion of the image on the screen 12 and make an "in focus" image. Although in the illustrated embodiment the light path from the projecting lens 14 to the screen 12 is a refracted path having a single reflecting mirror, it is also possible to provide more than one reflecting mirror to form a zig-zag light path, resulting in a further decreased depth of the projector.

Figure 6:
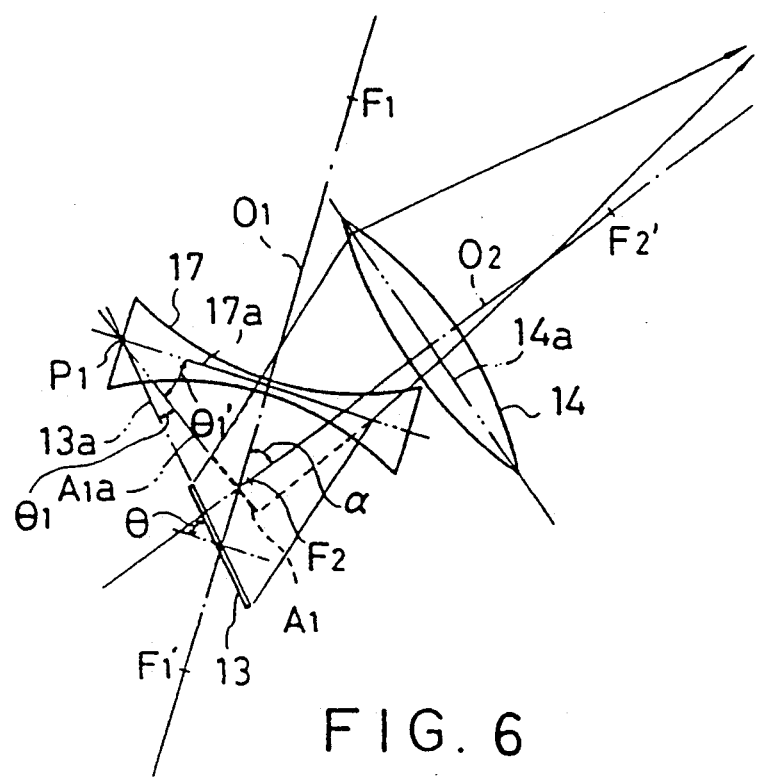
FIGS. 6, 7 and 8 are views showing different arrangements of a liquid crystal panel (object to be projected), auxiliary projecting lens and projecting lens, according to third, fourth and fifth embodiments of the present invention, respectively.

In the embodiment shown in FIGS. 3 and 4, the auxiliary projecting lens 17 is composed of a convex lens, as mentioned before. However, it is also possible to use a concave lens for the auxiliary projecting lens, as shown in FIGS. 5 and 6 which show a third embodiment of the present invention.

Figure 7:
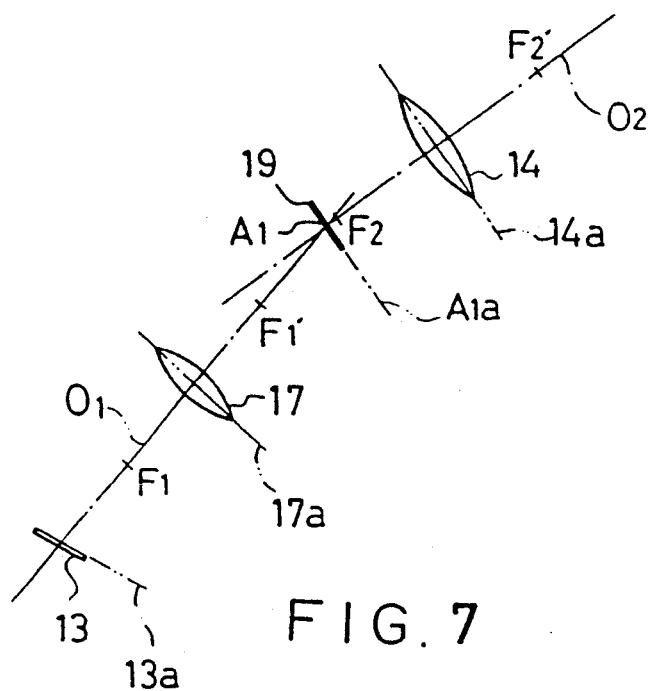

In the illustrated embodiment, the first projection image A1 which is formed by the auxiliary projecting lens 17 is an aerial image (real image or virtual image), so that the aerial image A1 is projected onto the screen 12 by the projecting lens 14. Alternatively, it is possible to provide a first image forming plane (intermediate image forming plane) which forms a real image between the auxiliary projecting lens 17 and the projecting lens 14, so that the first projection image A1 formed by the auxiliary projecting lens 17 can be a real image which is projected onto the screen 12 by the projecting lens 14. Namely, as shown in FIG. 7 which shows a fourth embodiment of the present invention, between the auxiliary projecting lens 17 which is made of a convex lens and the projecting lens 14 is provided a transmission type of first image forming plane (intermediate image forming plane) 19 which forms an image light transmitted through the auxiliary projecting lens 17 into a trapezoidally distorted real image on the first image forming plane 19. Thus, the real image A1 formed on the first image forming plane 19 is projected onto the screen 12 by the projecting lens 14. It should be born in mind that light which is transmitted through the auxiliary mirror 17 to be made incident upon the image plane 19 must be refracted toward the projecting lens 14. To this end, the first image forming plane 19 can be made of a prism plate having a plurality of elongated prism elements with small width which are successively located side by side in the direction of width, or an eccentric lens.

In the illustrated embodiment, the auxiliary projecting lens 17 is placed so that the optical axis 01 thereof intersects the optical axis 02 of the projecting lens 14. Alternatively, the auxiliary projecting lens 17 and the projecting lens 14 can be arranged along a same line so that the optical axes 01 and 02 thereof are identical to each other, by properly selecting the inclination angle of the liquid crystal display panel 13 and by making the focal points F1' and F2 of the auxiliary projecting lens 17 and the projecting lens 14 identical each other, respectively, as shown in FIG. 8.

Figure 8:
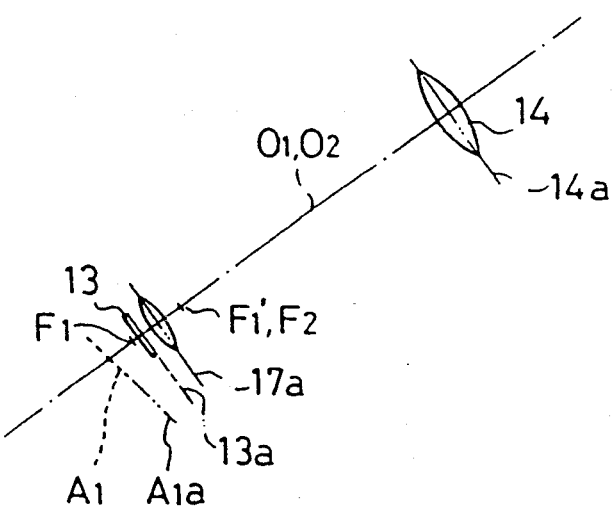

Also, in the embodiment shown in FIGS. 7 and 8, the first projection image A1 formed by the auxiliary projecting lens 17 is focused onto the plane A1a which intersects the planes 13a and 17a at the intersecting line P1 at which the extension plane 13a of the display surface of the liquid crystal panel 13 intersects the extension plane 17a of the principal plane of the auxiliary projecting plane 17. Furthermore, projecting lens 14 is positioned in such a way that the extension plane 14a of the principal plane thereof intersects the intersecting line on which the extension plane A1a of the image surface of the first projection image A1 (which is a real image formed on the first image forming plane 19 in FIG. 7 or is a virtual image in FIG. 8) formed by the auxiliary projecting lens 17 intersects the extension plane of the screen 12 (which is an actual screen plane or an imaginary screen plane which is obtained when the refracted light path from the projecting lens to the screen is lineary developed).

Although the indicator is used as the liquid crystal display panel 13 in the illustrated embodiments, the indicator can be a Braun tube (in this case the light source 15 is unnecessary), or an original picture film such as a reversal film.

Figure 9:
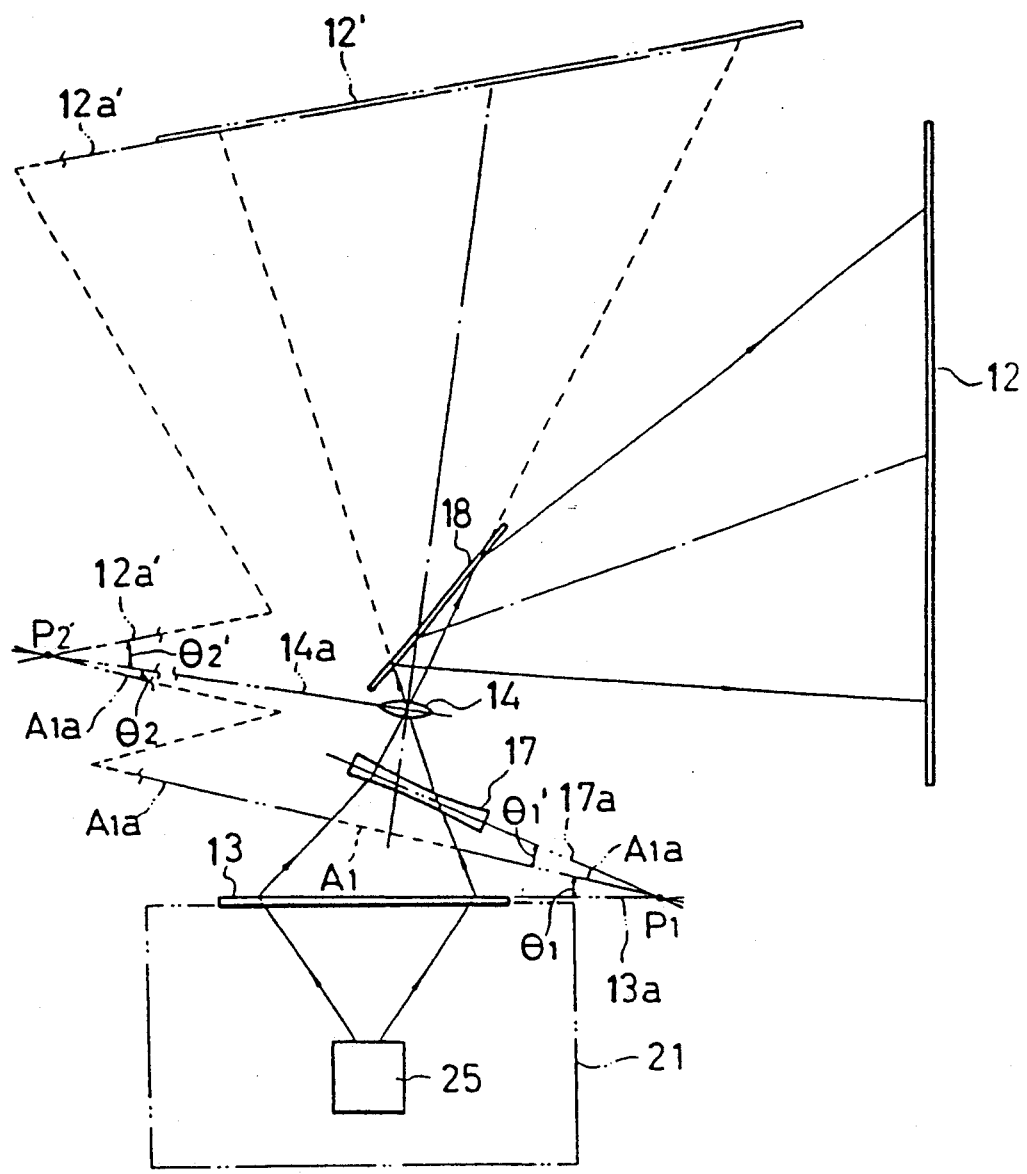
FIG. 9 is a side view of an optical system of a projector according to a sixth embodiment of the present invention.

FIG. 9 shows a sixth embodiment of the present invention which is applied to an overhead projector which projects an image onto an external projection plane. As is well known, there are two types of overhead projectors, one of which is a transmission type in which an indicator which is for example in the form of a document is illuminated from below, so that an image light which is transmitted through the document is projected onto the projection plane. The other overhead projector is of a reflection type in which light is incident upon a transmission type of document such as OHP sheet or the like from above, so that an image light which is formed when light reflected by a mirror such as a Fresnel mirror provided below the document is transmitted again through the document is projected onto the projection plane. The illustrated embodiment is applied to the transmission type of overhead projector by way of an example, but the present invention is not limited thereto. Namely, the present invention can also be applied to the reflection type of overhead projector.

The following discussion will be directed to such a transmission type of overhead projector shown in FIG. 9. In FIG. 9, numeral 21 designates a projector body which has a transparent upper surface on which a document (object to be projected) 13 such as a transparent original picture film is to be located. A light source 25 is provided in the projector body 21. The auxiliary projecting lens (concave lens in the illustrated embodiment) 17 is located between the projecting lens 14 and the document 13. An image light passing through the projecting lens 14 is reflected toward the external projection plane, such as the screen 12 by the reflection mirror 18'. The auxiliary projecting lens 17 and the projecting lens 14 are provided in a projection unit (not shown) supported by a column (not shown) on the projector body 21. The reflection mirror 18' is provided above the projection unit so as to adjust the inclination angle thereof.

In the overhead projector as mentioned above, the principal plane of the auxiliary projecting lens 17 is inclined with respect to the plane of the document 13, so that the image surface of the first projection image A1 (a virtual image in the illustrated embodiment) formed by the auxiliary lens 17 is inclined relative to the principal plane of the projecting lens 14. The auxiliary projecting lens 17 and the projecting lens 14 have a positioned relationship as specified in the above mentioned equation (1). With this arrangement, the image projected on the screen 12 has no trapezoidal distortion, similarly to the previously mentioned embodiments.

In addition, the arrangement shown in FIG. 9 satisfies the relationship given by the above mentioned equation (2). This ensures that the image projected on the screen is completely analogous to the indication image of the document 13. The extension plane 17a of the principal plane of the auxiliary projecting lens 17 intersects the intersecting line P1 on which the extention plane 13a of the document 13 intersects the extention plane A1a of the image surface of the first projection image A1 formed by the auxiliary projecting lens 17. Furthermore, the extention plane 14a of the principal plane of the projecting lens 14 intersects the intersecting line P2' on which the extention plane A1a of the image surface of the first projection image A1 intersects the extention plate 12a' of the imaginary screen plane 12' which is formed when the refracted light path from the projecting lens 14 to the screen 12 is linearly developed. With this arrangement, similarly to the afore mentioned embodiments, an "in focus" image of the document 13 can be formed on the screen 12.

Figure 10:
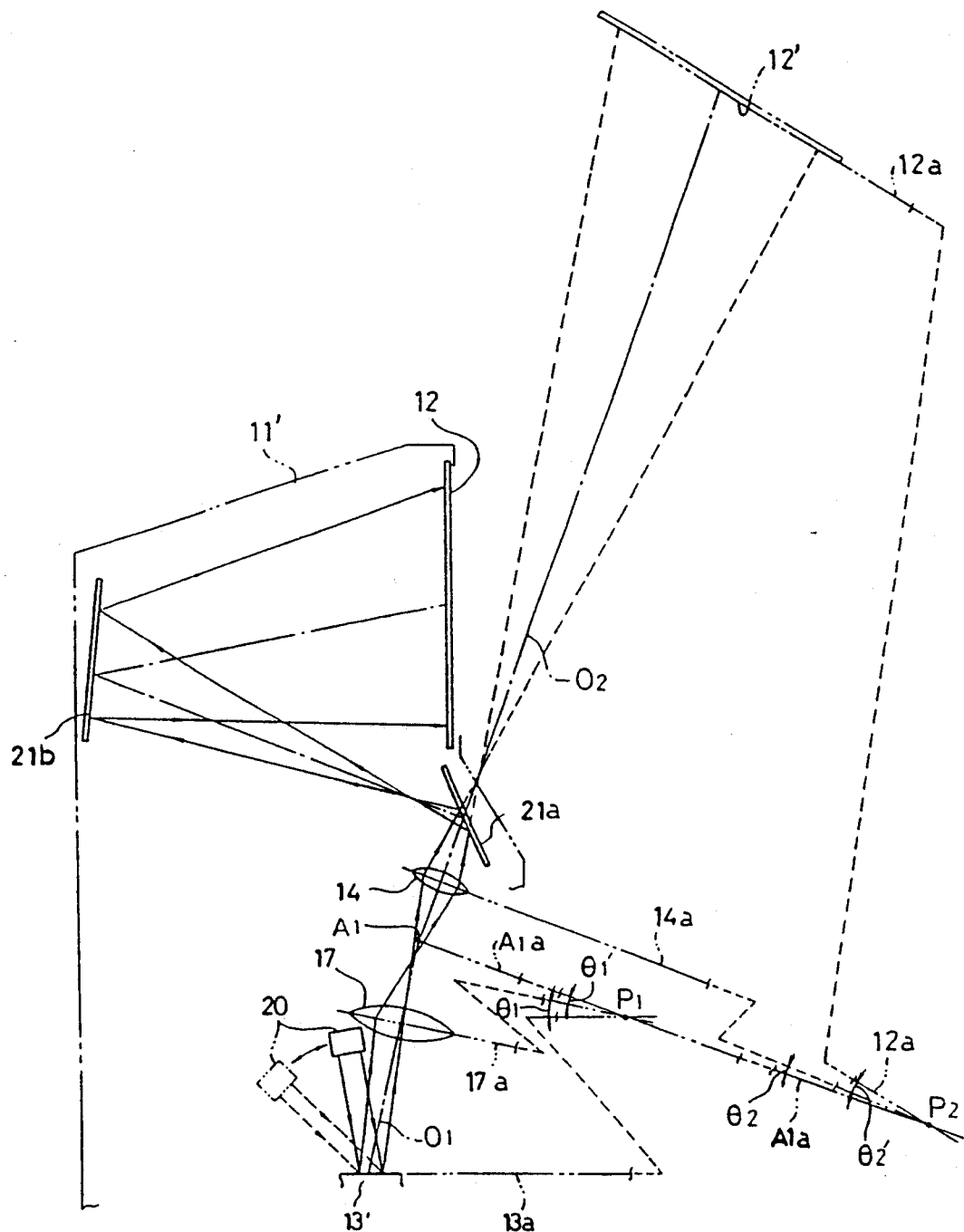
FIG. 10 is a side view of an embodiment which is applied to an inspector.
Figure 11:
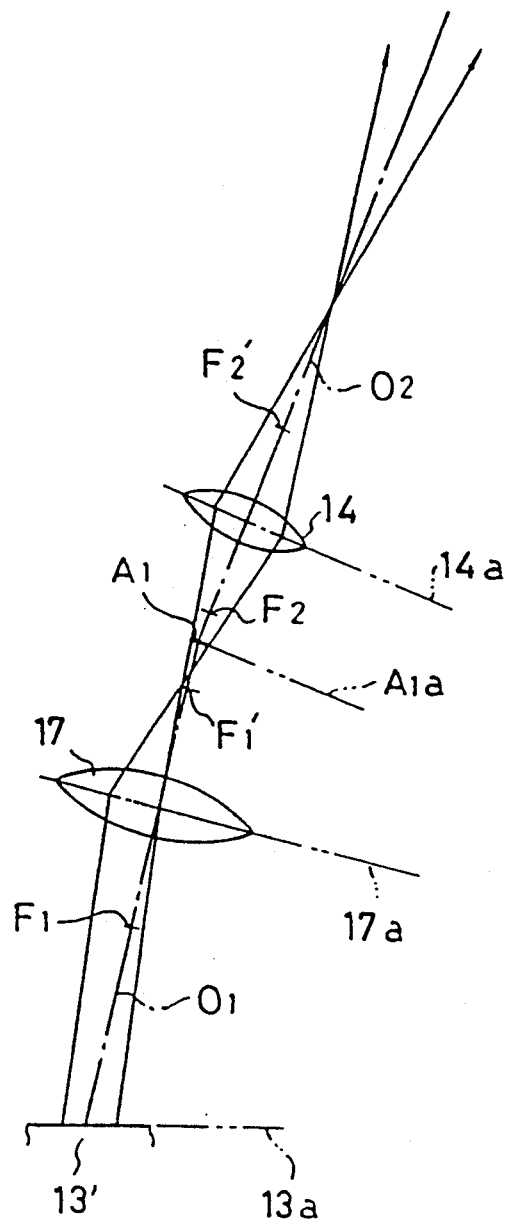
FIG. 11 is a view of an equivalent arrangement of object to be inspected (object to be projected), auxiliary projecting lens and projecting lens, shown in FIG. 10.

FIGS. 10 and 11 show still another embodiment which is applied to a projection inspector 11' in which an object to be inspected (objected to be projected) is illumitated with a illumination light to project an enlarged image of the object. In this apparatus, the liquid crystal display panel 13 shown in FIGS. 3 and 4 is replaced with an object 13' to be inspected. Furthermore, a light source 20 is additionally provided to illuminate the object 13'. In addition, first and second reflection mirrors 21a and 22b are provided in the optical path extending to the screen 12. The remaining construction of FIGS. 10 and 11 is substantially the same as that of FIGS. 3 and 4. The light source 20 is used for a bright field inspection and for a dark field inspection. That is, the light source 20 can be rotationally moved between a first position (which is shown by a solid line in the drawings; for bright field inspection) in which a surface of a testpiece (object to be inspected) 13' is illuminated with an illuminating light in the direction in which a regular reflection light from the surface of the testpiece 13' is incident upon the auxiliary projecting lens 17, and a second position (which is shown by a dotted line in the drawings; for dark field inspection) in which a surface of a testpiece (object to be inspected) 13' is illuminated with an illuminating light in the direction in which a regular reflection light from the surface of the testpiece 13' is not made incident upon the auxiliary projecting lens 17. Although the actual arrangement and the direction of the optical components shown in FIGS. 10 and 11 are different from those of the optical components shown in FIGS. 3 and 4, they are optically equivalent to each other, as shown in FIG. 1. Namely, the equation (1) or the equations (1) and (2) is or are given in the projection inspector 11' of the embodiment shown in FIGS. 10 and 11.

In FIGS. 10 and 11, the surface of the testpiece 13' is illuminated with light emitted by the light source 20, so that the light reflected by the surface of the testpiece is made incident upon the auxiliary projecting lens 17 to form an intermediate projection image A1 of the surface of the testpiece 13', whereby the intermediate projection image is enlarged and projected by the projecting lens 14 on the transmission type screen 12. As can be understood from the foregoing, when the surface of the testpiece is rectangular shown in FIG. 2a, the intermediate projection image A1 formed by the auxiliary projecting lens 17 is distorted or deformed into a trapezoidal shape. However, when the trapezoidal intermediate projection image A1 is projected onto the screen 12 through the projecting lens 14, the trapezoidal distortion is cancelled, so that a rectangular image can be obtained, as shown in FIG. 2c. This results in an easy inspection and an increased precision of inspection.

Although two mirrors 21a and 21b are provided in the projection light path from the projecting lens 14 to the screen 12 in the illustrated embodiments, the number of mirrors is not limited thereto. Namely, a single mirror or more than two mirrors can be provided. Furthermore, although the light path from the projecting lens 14 to the screen 12 is a refracted light path having therein the mirrors 21a and 21b, the light path can be a linear light path along which light transmitted through the projecting lens 14 is directly projected onto the screen 12. In this alternative of the linear light path in place of the refracted light path, the auxiliary projecting lens 17 and the projecting lens 14 are arranged to have the relationship as specified by the equation (1) or the equations (1) and (2).

Similarly to the first embodiment mentioned above, the extension plane 17a of the principal plane of the auxiliary projecting lens 17 intersects the intersecting line P1 on which the extention plane 13a of the surface of the testpiece 13' intersects the extension plane A1a of the image surface of the intermediate projection image A1 formed by the auxiliary projecting lens 17. Furthermore, the extension plane 14a of the principal plane of the projecting lens 14 intersects the intersecting line on which the extension plane A1a of the image surface of the intermediate projection image A1 intersects the extension plane of the actual screen 12. With this arrangement, an "in-focus" projection image of the surface of the testpiece 13' can be formed on the screen without any distortion.

Furthermore, although the screen 12 is of a transmission type which is provided on the front face of the projector body 11 in the illustrated embodiment, the projection plane on which the image of the surface of the testpiece 13' is to be projected can be an external projection plane, such as a reflection type screen, separated from the projector body 11.

In the above mentioned embodiment, the light source system for illuminating the surface of the testpiece 13' is composed of a single light source 20 which is moved between the first position for bright field inspection and the second position for dark field inspection. Alternatively, it is also possible to provide two independent light sources for bright field inspection and dark field inspection, respectively.

Figure 12:
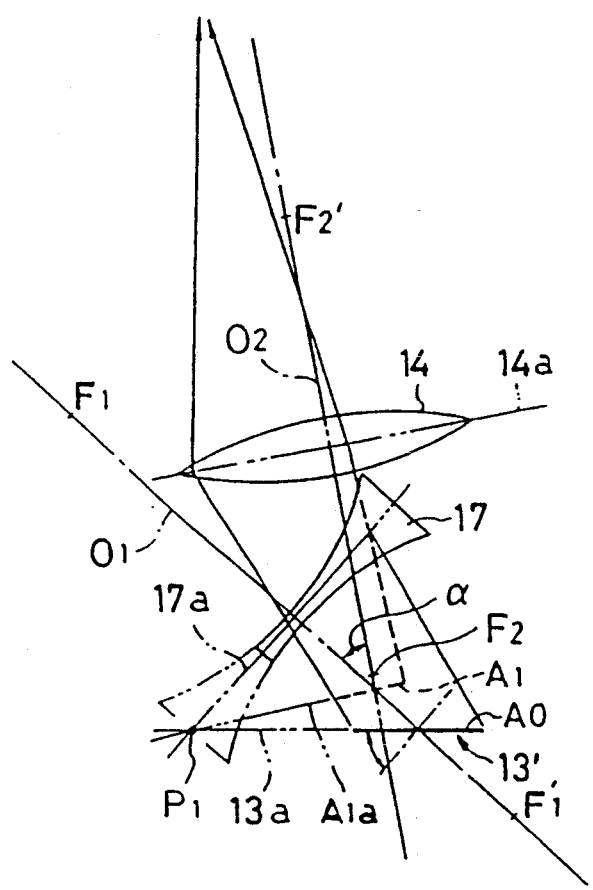
FIG. 12 is a view of an arrangement of object to be inspected (object to be projected), auxiliary projecting lens and projecting lens, in an inspector to which the present invention is applied.
Figure 13:
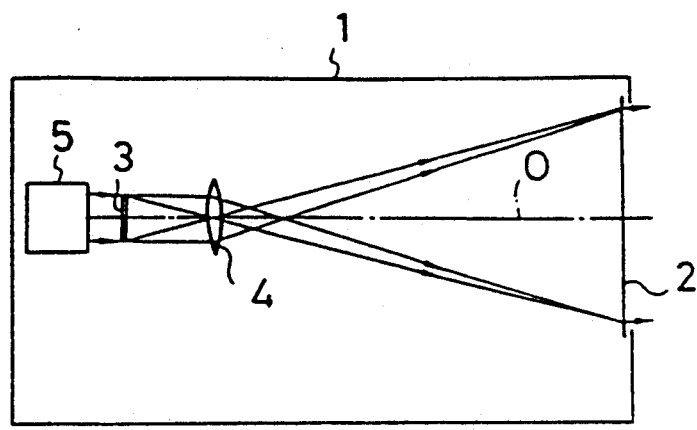
FIG. 13 is a longitudinal sectional side view of a known projector.
Figure 14:
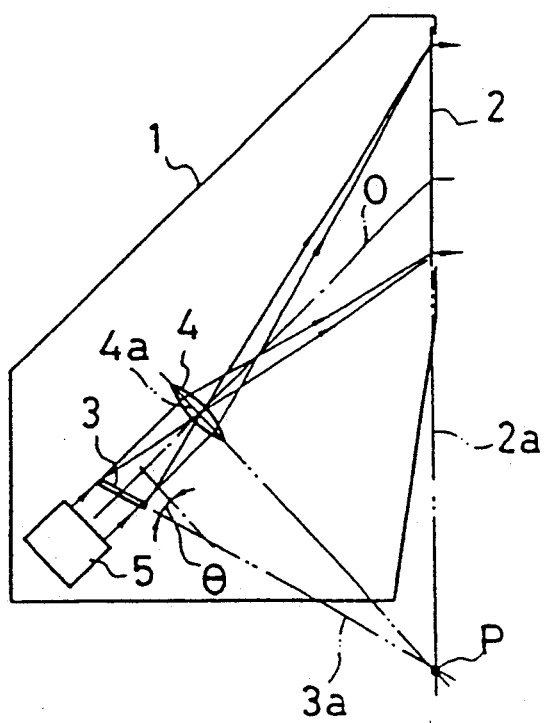
FIG. 14 is a longitudinal sectional side view of another known projector.

It should be appreciated that the auxiliary projecting lens 17, which is made of a convex lens, can be replaced with a concave lens. In this alternative, the auxiliary projecting lens 17 and the projecting lens 14 are arranged as shown in FIG. 12. Note that the intermediate projection image A1 which is formed by the auxiliary projecting lens 17 in the form of a concave lens is a virtual image which is projected onto the projection plane by the projecting lens 14. In an embodiment shown in FIG. 12, the intermediate projection image (virtual image or real image) A1 formed by the auxiliary projecting lens 17 is on the surface A1a which substantially intersects the two planes 13a and 17a at the intersecting line P1 at which the extention plane 13a of the surface A0 of the testpiece 13' intersects the extension plane 17a of the principal plane of the auxiliary projecting lens 17. The extension plane 14a of the principal plane of the projecting lens 14 intersects the intersecting line on which the extension plane A1a of the image surface of the intermediate projection image A1 formed by the auxiliary projecting lens 17 intersects the extension plane of the projection plane (an imaginary projection plane when the curved light path from the projecting lens to the projection plane is linearly developed, or an actual projection plane).

We claim:

1. A rear projection type projector including a casing provided with a display window and an image projecting apparatus mounted in said casing, said image projecting apparatus comprising:

screen means, of a transmission type, provided on said display window for permitting the transmission of an image through said window, a rear surface of said screen means facing towards said casing;

at least one liquid crystal display means for forming an image;

light source means for illuminating said light crystal display means; and projecting means for enlarging and projecting said image formed by said liquid crystal display means onto said screen means from a direction inclined with respect to said screen means, said projecting means comprising an auxiliary projecting lens which projects an image to be projected to form an intermediate image, and a projecting lens which projects said intermediate image formed by said auxiliary projecting lens onto said screen means, a plane perpendicular to an optical axis of said auxiliary projecting lens and including an image focal point of said auxiliary projecting lens, and a plane perpendicular to an optical axis of said projecting lens and including an object focal point of said projecting lens, intersect along a line, said line on which said plane intersect lying in a plane of said intermediate image, wherein an image of said object is formed on said screen means without distortion.

2. A projecting apparatus comprising a first projecting lens for projecting an object to form an intermediate image, and a second projecting lens projecting said intermediate image formed by said first projecting lens onto a screen, said first projecting lens and said second projecting lens being disposed such that a plane perpendicular to an optical axis of said first projecting lens and including an image focal point of said first projecting lens, intersects a plane perpendicular to an optical axis of said second projecting lens and including an object focal point of said second projecting lens, wherein a line on which said planes intersect lies in a plane of said intermediate image, said first projecting lens being adapted to distort said object image, said second projecting lens being adapted to correct said distorted image to project an enlarged image of the object without distortion onto said screen.

3. The projecting apparatus according to claim 2, wherein said first projecting lens forms an intermediate image which is distorted into a trapezoidal shape, when the object is rectangular, and wherein said second projecting lens distorts said distorted image formed by said first projection lens in the opposite direction to project an enlarged image of the object onto to said screen.

4. A projecting apparatus comprising:
   a first projecting system having an auxiliary projecting lens for projecting an object to be projected to form an intermediate image, so that said object and said auxiliary projecting lens are located such that an extension of a surface of said object, an extension of a principle plane of said auxiliary projecting lens, and an extension of said intermediate image substantially intersect at a first straight line; and
   a second projecting system including a projecting lens for projecting said intermediate image onto a screen, said projecting lens and said screen being arranged in such a way that an extension of said intermediate image, an extension of a principle plane of said projecting lens, and an extension of said screen substantially intersect at a second straight line, wherein said extension of a principle plane of said projection lens and an extension of said object to be projected meet at a line.

5. The projecting apparatus according to claim 4, wherein a projection light path from said projecting lens to the projection plane is a refracted light path having at least one reflection mirror to reflect an image light transmitted through said projection lens to be projected onto the projection plane.

6. The projecting apparatus according to claim 4, wherein said auxiliary projecting lens is a convex lens.

7. The projecting apparatus according to claim 4, wherein said auxiliary projecting lens is a concave lens.

8. The projecting apparatus according to claim 4, wherein said intermediate image formed by said auxiliary projecting lens is an aerial image.

9. A rear projection type projector including a casing provided with a display window and an image projecting apparatus mounted in said casing, said image projecting apparatus comprising:
   screen means, of a transmission type, provided on said display window for permitting the transmission of an image thorough said window, a rear surface of said screen means facing towards said casing; and
   projecting means for enlarging and projecting an object onto said screen means from a direction inclined with respect to said screen means, said projecting means comprising first projecting lens means, having a principle plane located on a first imaginary plane, for projecting said object to form an intermediate image on a second imaginary plane, and second projecting means, having a principle plane located on a third imaginary plane, for projects said intermediate image, wherein an extension of a surface of said object, of said first imaginary plane and said second imaginary plane intersect at least on a first imaginary straight line, said second imaginary plane, said third imaginary plane and an extension of said screen means intersect at least on a second imaginary straight line.

10. A rear projection type projector according to claim 9, wherein said screen means is a transmission type screen means, and comprises refracting means for correcting the reflected image so as to project in a direction normal to said screen means.

* * * * *

UNITED STATES PATENT AND TRADEMARK OFFICE
CERTIFICATE OF CORRECTION

PATENT NO. : 5,302,983
DATED : April 12, 1994
INVENTOR(S) : Makato SATO et al.

It is certified that error appears in the above-indentified patent and that said Letters Patent is hereby corrected as shown below:

```
    At column 14, line 57 (claim 1, line 29) of the printed
patent, change "plane" (first occurrence) to ---planes---.
    At column 16, line 28 (claim 9, line 19) of the printed
patent, change "projects" to ---projecting---.
```

Signed and Sealed this

Twenty-ninth Day of August, 1995

Attest:

BRUCE LEHMAN

*Attesting Officer*     *Commissioner of Patents and Trademarks*